(12) United States Patent
Lee et al.

(10) Patent No.: US 11,636,753 B2
(45) Date of Patent: Apr. 25, 2023

(54) VEHICLE AND METHOD FOR CONTROLLING AN EMERGENCY CALL THEREFOR

(71) Applicants: Hyundai Motor Company, Seoul (KR); Kia Corporation, Seoul (KR)

(72) Inventors: Sang Min Lee, Suwon-si (KR); Su Hyeon Chae, Hwaseong-si (KR); Sang Gu Kwon, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/643,660

(22) Filed: Dec. 10, 2021

(65) Prior Publication Data

US 2022/0207987 A1 Jun. 30, 2022

(30) Foreign Application Priority Data

Dec. 29, 2020 (KR) .................. 10-2020-0186424

(51) Int. Cl.
| | | |
|---|---|---|
| G08B 25/10 | (2006.01) | |
| B60Q 9/00 | (2006.01) | |
| B60R 21/013 | (2006.01) | |
| H04W 4/90 | (2018.01) | |

(52) U.S. Cl.
CPC .............. *G08B 25/10* (2013.01); *B60Q 9/00* (2013.01); *B60R 21/013* (2013.01); *H04W 4/90* (2018.02)

(58) Field of Classification Search
CPC .... G08B 25/10; G08B 25/016; G08B 25/185; B60Q 9/00; B60R 21/013; B60R 16/02; B60R 25/102; B60R 21/01; B60R 2021/01013; B60R 2021/0104; B60R 2021/01211; B60K 35/00; B60K 2370/178; B60K 2370/58; B60Y 2400/30; H04W 4/90; H04W 4/44
See application file for complete search history.

(56) References Cited

U.S. PATENT DOCUMENTS

| | | | |
|---|---|---|---|
| 2010/0137006 A1* | 6/2010 | Rofougaran | H04M 1/6075 455/457 |
| 2013/0005292 A1* | 1/2013 | Stahlin | H04L 12/6418 455/404.1 |
| 2014/0288781 A1* | 9/2014 | Horiguchi | B60R 21/01 701/45 |
| 2015/0348337 A1* | 12/2015 | Choi | G07C 5/08 701/31.5 |

(Continued)

*Primary Examiner* — Ojiako K Nwugo
(74) *Attorney, Agent, or Firm* — Slater Matsil, LLP

(57) ABSTRACT

The present disclosure relates to a vehicle and a method for controlling an emergency call therefor, and more particularly, to a vehicle capable of performing a more stable and reliable emergency call and a method for controlling an emergency call therefor. The method for controlling an emergency call for a vehicle according to an embodiment includes monitoring a sensor signal in an accident determination unit of a control unit; determining whether or not an airbag is deployed based on the sensor signal in the accident determination unit; requesting an automatic emergency call from the accident determination unit to an emergency call unit of the control unit if the airbag is deployed as a result of the determination; and attempting to transmit a call to an emergency rescue center in response to the request from the emergency call unit.

20 Claims, 2 Drawing Sheets

(56) References Cited

U.S. PATENT DOCUMENTS

| | | | | |
|---|---|---|---|---|
| 2017/0146661 A1* | 5/2017 | Hwang | ............... | G01S 19/06 |
| 2017/0171733 A1* | 6/2017 | Jung | ............... | H04W 4/40 |
| 2018/0176757 A1* | 6/2018 | Kaindl | ............... | G08G 1/205 |
| 2018/0242132 A1* | 8/2018 | Iwata | ............... | H04W 4/90 |
| 2018/0270640 A1* | 9/2018 | Iwata | ............... | G08B 25/016 |

* cited by examiner

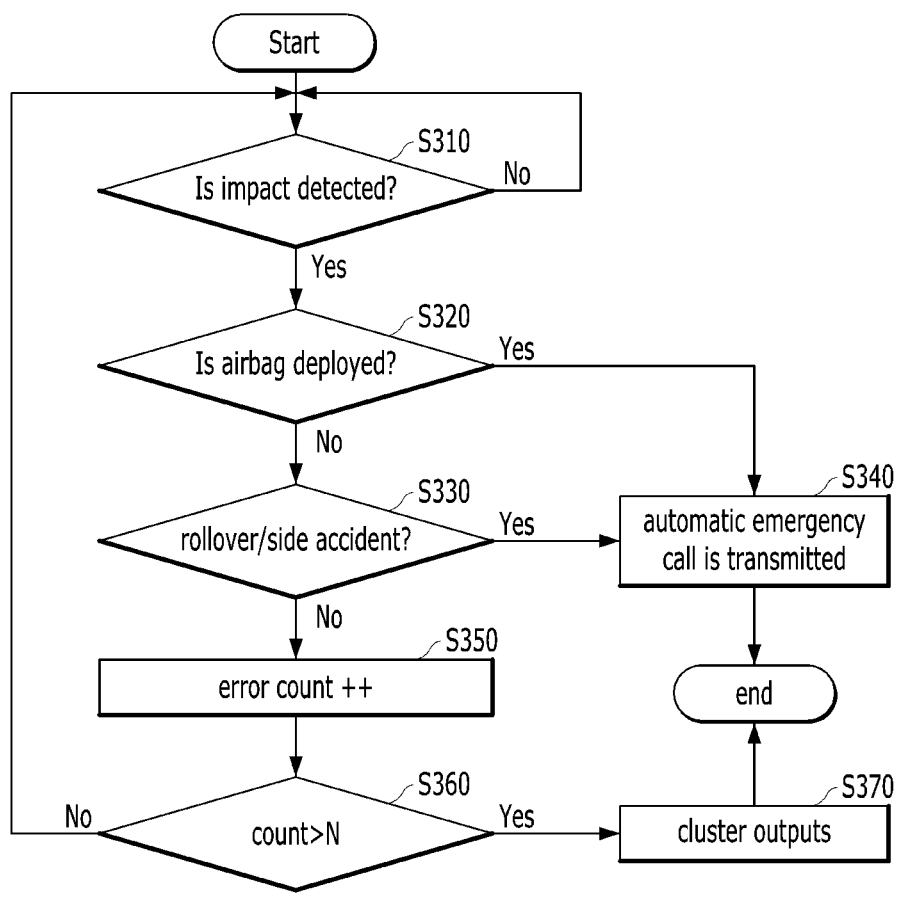

VEHICLE AND METHOD FOR CONTROLLING AN EMERGENCY CALL THEREFOR

CROSS-REFERENCE TO RELATED APPLICATIONS

This application claims the benefit of Korean Patent Application No. 10-2020-0186424, filed on Dec. 29, 2020, which application is hereby incorporated herein by reference.

TECHNICAL FIELD

The present invention relates to a vehicle and a method for controlling an emergency call therefor, and more particularly, to a vehicle capable of performing a more stable and reliable emergency call and a method for controlling an emergency call therefor.

BACKGROUND

An emergency call (eCall) function refers to a function that automatically attempts to connect a call to a preset emergency rescue center when an accident is detected in a vehicle, such as airbag deployed or vehicle rollover. Currently, the eCall function is compulsory by law in countries such as Europe, Russia, and Turkey, and many countries in Asia and the Middle East are also considering enacting laws.

A system in which such an emergency call function is implemented will be described with reference to FIG. 1.

FIG. 1 is a block diagram showing an example of a system configuration in which a general emergency call function is implemented.

Referring to FIG. 1, an emergency call system may be configured to include a vehicle 10 and an emergency rescue center 20.

The vehicle 10 includes a sensor unit 11 having a plurality of sensors, an airbag control unit (ACU) 12, a central gateway (CGU) 13, and an eCall unit 14. The plurality of sensors of the sensor unit 11 is disposed in each part of the vehicle to detect the impact or acceleration applied to the vehicle, and the airbag control unit 12 determines whether or not an accident has occurred, whether or not an airbag is deployed and the like based on the signal obtained from the sensor unit 11. When the airbag control unit 12 determines that an accident has occurred, a certain signal (for example, CF_ACU_CshAct==1) is outputted, and the corresponding signal is transmitted to the eCall unit 14 through the CGW 13. When the eCall unit 14 receives the certain signal, the emergency call connection to the emergency rescue center 20 is attempted.

However, the certain signal that triggers the eCall function is incorrectly transmitted due to a malfunction of the CGW 13, the ACU 12, or other control unit even in a situation where no accident occurs, so there is a problem in that the emergency call transmission by the eCall unit 14 occurs.

In addition, when the CGW 13 does not operate due to the damage to the battery as a result of an actual accident, the certain signal may not be transmitted to the eCall unit 14 even if the ACU 12 outputs the certain signal that triggers the eCall function.

SUMMARY

Embodiments provide a vehicle capable of providing a more stable and reliable emergency call function and a method for controlling an emergency call therefor.

The technical problems to be solved in embodiments are not limited to the technical problems mentioned above, and other technical problems not mentioned will be clearly understood by those of ordinary skill in the art to which the embodiments belong from the description below.

In order to solve the above technical problem, the method for controlling an emergency call for a vehicle according to an embodiment may include the steps of monitoring a sensor signal in an accident determination unit of a control unit; determining whether or not an airbag is deployed based on the sensor signal in the accident determination unit; requesting an automatic emergency call from the accident determination unit to an emergency call unit of the control unit if the airbag is deployed as a result of the determination; and attempting to transmit a call to an emergency rescue center in response to the request from the emergency call unit.

In addition, the vehicle according to an embodiment may include a sensor unit including a plurality of sensors and a control unit to obtain a sensor signal from the sensor unit, the control unit may include an accident determination unit that determines whether or not an airbag is deployed based on the sensor signal, and requests an automatic emergency call if the airbag is deployed as a result of the determination; and an emergency call unit that attempts to transmit a call to an emergency rescue center in response to the emergency call request.

The vehicle related to at least one embodiment configured as described above can perform more reliable and stable emergency call function control.

In particular, the integrated control unit according to an embodiment is more resistant to errors because an airbag control function and an emergency call function are integrated.

The effects obtainable in embodiments are not limited to the above-mentioned effects, and other effects not mentioned may be clearly understood by those of ordinary skill in the art to which the embodiments belong from the following description.

BRIEF DESCRIPTION OF THE DRAWINGS

FIG. 3 is a flowchart illustrating an example of an emergency call control process according to an embodiment.

DETAILED DESCRIPTION OF ILLUSTRATIVE EMBODIMENTS

Figure 1:
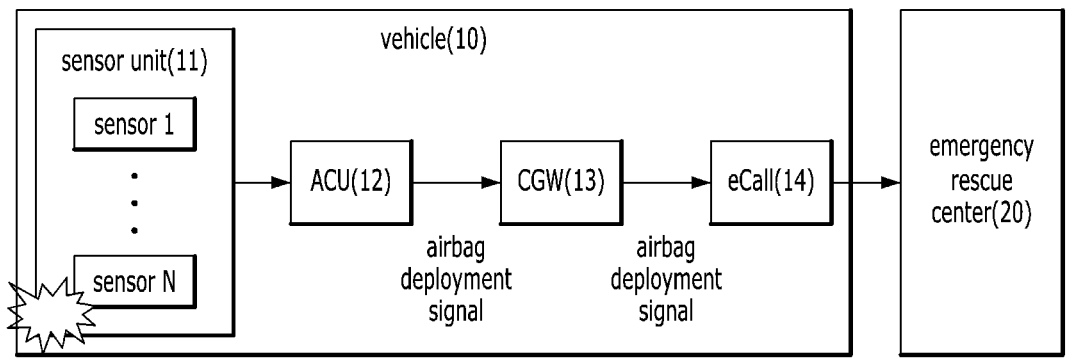
FIG. 1 is a block diagram showing an example of a system configuration in which a general emergency call function is implemented.

Hereinafter, with reference to the accompanying drawings, embodiments will be described in detail so that those of ordinary skill in the art can easily implement them. However, the embodiments may be embodied in various different forms and is not limited to the embodiments described herein. And in order to clearly explain the embodiments in the drawings, parts irrelevant to the description are omitted, and similar reference numerals are attached to similar parts throughout the specification.

Throughout the specification, when a part "includes" a certain component, it means that other components may be further included, rather than excluding other components, unless otherwise stated. In addition, parts indicated with the same reference numerals throughout the specification mean the same components.

Figure 2:
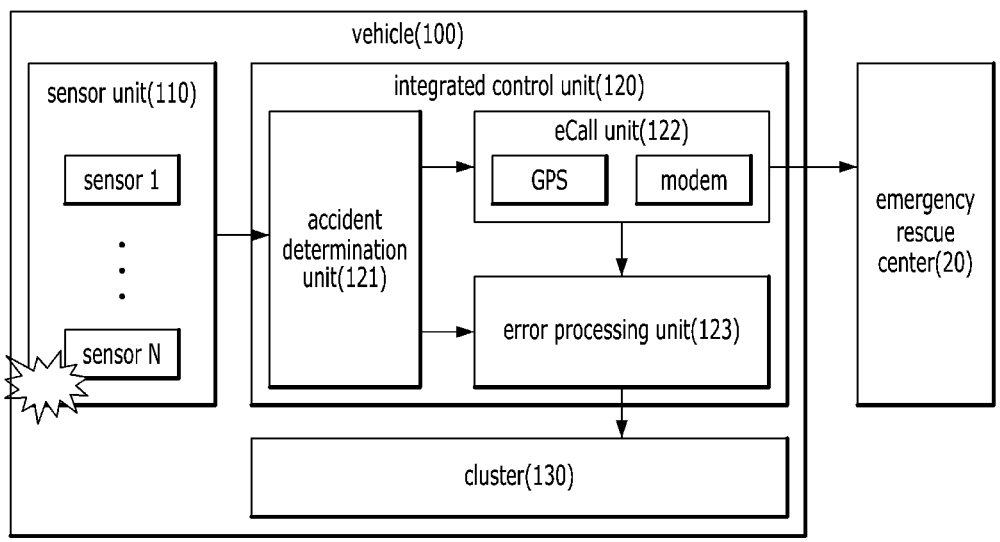
FIG. 2 shows an example of a vehicle configuration according to an embodiment.

FIG. 2 shows an example of a vehicle configuration according to an embodiment.

Referring to FIG. 2, the vehicle 100 according to an embodiment may include a sensor unit 110 having a plurality of sensors, an integrated control unit 120, and a cluster 130. The components shown in FIG. 2 are mainly illustrated with the elements related to the embodiments, and it is apparent that more or fewer components may be included in an actual vehicle implementation.

The plurality of sensors of the sensor unit 11o may be disposed in each part of the vehicle to detect the impact or acceleration applied to the vehicle.

The integrated control unit 120 may include an accident determination unit 121, an emergency call (eCall) unit 122, and an error processing unit 123.

The accident determination unit 121 may determine whether or not an accident has occurred and the type of accident based on the information obtained from the sensor unit 110, and may determine whether or not automatic emergency call is transmitted or the integrated control unit is in error based on the determination result. For example, when the airbag is deployed or it is determined as a rollover accident or a side accident even in a situation where the airbag is not deployed based on the signal of the sensor unit 110, the accident determination unit 121 may request the eCall unit 122 to send an automatic emergency call. In this case, the accident determination unit 121 may transmit the information on whether or not the airbag is deployed and the accident type together to the eCall unit 122. The information on the accident type can be output in the form of a Diagnostic Trouble Code (DTC). For example, in case of a frontal collision, Code AAAA may be output, and in case of a rollover (overturn) accident, Code BBBB, etc. may be output, but this is exemplary and is not necessarily limited thereto.

In addition, when the airbag is not deployed even though the occurrence of an impact is detected and it is not determined as a rollover accident or a side accident based on the signal of the sensor unit 110, the accident determination unit 121 may notify the error processing unit 123 of this.

The eCall unit 122 may include a Global Positioning System (GPS) module to determine a current location and a modem for communication connection with the emergency rescue center 20. The eCall unit 122 may transmit the emergency call to the preset emergency rescue center 20 according to the notification of the accident determination unit 121, and when the information on whether or not the airbag is deployed and the accident type is obtained from the accident determination unit 121, the eCall unit 122 may transmit the corresponding information to the emergency rescue center 20 together with the location information obtained through the GPS module.

As described above, the error processing unit 123 may receive a certain signal from the accident determination unit 121 when the airbag is not deployed and it is not determined as a rollover accident or a side accident even though the occurrence of an impact is detected based on the signal of the sensor unit 110. In this case, the error processing unit 123 may increase the count of the error counter by 1, and may receive GPS information (i.e., location and time) at the time from the eCall unit 122 and record it together. If the count reaches a preset number, a warning output request such as lighting of an airbag warning lamp may be transmitted to the cluster 130. Through this, a customer may be induced to conduct an inspection of the integrated control unit 120 including the airbag function, and a mechanic may check an error history by checking an error counter and GPS information through a diagnostic equipment.

When the warning output request is received from the error processing unit 123, the cluster 130 may turn on the airbag warning lamp or output visual information in a form different from the warning lamp (e.g., output of inspection guidance text, etc.) according to the request. Here, the cluster 130 is exemplary and is not limited to any type of output device as long as it can output information corresponding to the warning output request of the error processing unit 123 in a predetermined format. For example, the cluster 130 may be replaced with a display of an Audio/Video/Navigation (AVN) system, a Head Up Display (HUD) and the like.

The integrated control unit 120 described so far has the following advantages compared to the configuration in which the general airbag control unit (ACU) described with reference to FIG. 1 requests the automatic emergency call transmission to the eCall unit through the CGW.

First, since the eCall unit 122 that performs emergency call transmission directly receives a transmission request from the accident determination unit 121 inside the integrated control unit 120 without going through the CGW, there is no concern of mistransmission due to the mistransmission of the signal triggered by other control unit or CGW. In addition, when an actual accident occurs, the eCall unit 122 may directly receive a transmission request from the accident determination unit 121 irrespective of whether the CGW and the like operates normally. In addition, as each of the airbag function and the emergency call function is implemented in the form of the integrated control unit rather than a separate control unit, vehicle communication connection elements such as cables, connectors and the like can be reduced, thereby lowering a failure rate and reducing cost and vehicle weight.

FIG. 3 is a flowchart illustrating an example of an emergency call control process according to an embodiment.

Referring to FIG. 3, the accident determination unit 121 of the integrated control unit 120 monitors the signal of the sensor unit 110 while the vehicle is driving, and when an impact is detected (Yes in S310), whether or not the airbag is deployed (S320) and the accident type (S330) are determined.

If the airbag is deployed (Yes in S320) or if the airbag is not deployed (No in S320) but it is determined as a certain accident type such as a rollover accident or a side accident (Yes in S330), the accident determination unit 121 may request automatic emergency call to the eCall unit 122. Accordingly, the eCall unit 122 may attempt to transmit an emergency call to the emergency rescue center (S340), and if the connection is successful, information on whether or not the airbag is deployed, the accident type, the current location and the like may be transmitted.

On the other hand, when the airbag is not deployed even though the impact is detected and it does not correspond to the certain accident type (No in S330), the accident determination unit 121 notifies the error processing unit 123 of this. Accordingly, the error processing unit 123 increases the count of the error counter (S350), and when the count of the air counter exceeds a certain number (N) (Yes in S360), the warning information may be output through the display device such as the cluster (S370).

The embodiment described above can be implemented as computer-readable code on a medium in which a program is recorded. The computer-readable medium includes all kinds of recording devices in which data readable by a computer system is stored. Examples of computer-readable media include Hard Disk Drive (HDD), Solid State Disk (SSD), Silicon Disk Drive (SDD), ROM, RAM, CD-ROM, magnetic tape, floppy disk, optical data storage device and the like.

Accordingly, the above detailed description should not be construed as restrictive in all respects but as exemplary. The scope of the present invention should be determined by a reasonable interpretation of the appended claims, and all modifications within the equivalent scope of the present invention are included in the scope of the present invention.

What is claimed is:

1. A method for controlling an emergency call for a vehicle, the method comprising:
    monitoring a sensor signal in an accident determination unit of a control unit;
    determining whether or not an airbag is deployed based on the sensor signal in the accident determination unit;
    determining an accident type when it is determined that the airbag is not deployed;
    requesting an automatic emergency call from the accident determination unit to an emergency call unit of the control unit when it is determined that the airbag is deployed; and
    attempting to transmit a call to an emergency rescue center in response to the request from the emergency call unit.

2. The method according to claim 1, further comprising requesting the automatic emergency call from the accident determination unit to the emergency call unit if the determined accident type is a certain accident type.

3. The method according to claim 2, further comprising increasing a count of an error counter in an error processing unit of the control unit if the determined accident type is not the certain accident type.

4. The method according to claim 3, further comprising outputting warning information through an output device if the count exceeds a preset number.

5. The method according to claim 4, wherein the output device includes a cluster, and the warning information includes an airbag warning light.

6. The method according to claim 5, wherein the increasing the counter comprises storing time and location information in the error processing unit.

7. The method according to claim 4, wherein the increasing the counter comprises storing time and location information in the error processing unit.

8. The method according to claim 7, wherein the time and location information is obtained from GPS information of the emergency call unit.

9. The method according to claim 3, wherein the increasing the counter comprises storing time and location information in the error processing unit.

10. The method according to claim 9, wherein the time and location information is obtained from GPS information of the emergency call unit.

11. A non-transitory computer-readable recording medium recording a program for executing a method for controlling an emergency call for a vehicle, the method comprising:
    monitoring a sensor signal in an accident determination unit of a control unit;
    determining whether or not an airbag is deployed based on the sensor signal in the accident determination unit;
    determining an accident type when it is determined that the airbag is not deployed;
    requesting an automatic emergency call from the accident determination unit to an emergency call unit of the control unit when it is determined that the airbag is deployed; and
    attempting to transmit a call to an emergency rescue center in response to the request from the emergency call unit.

12. The non-transitory computer-readable recording medium according to claim 11, wherein the method further comprises requesting the automatic emergency call from the accident determination unit to the emergency call unit if the determined accident type is a certain accident type.

13. The non-transitory computer-readable recording medium according to claim 12, wherein the method further comprises increasing a count of an error counter in an error processing unit of the control unit if the determined accident type is not the certain accident type.

14. A vehicle comprising:
    a sensor unit including a plurality of sensors; and
    a control unit configured to obtain a sensor signal from the sensor unit,
    wherein the control unit comprises:
        an accident determination unit configured to determine whether or not an airbag is deployed based on the sensor signal, determine an accident type when the airbag is not deployed, and request an automatic emergency call when the airbag is deployed; and
        an emergency call unit configured to attempt to transmit a call to an emergency rescue center in response to the emergency call request.

15. The vehicle according to claim 14, wherein the accident determination unit is configured to request the automatic emergency call to the emergency call unit if the determined accident type is a certain accident type.

16. The vehicle according to claim 15, wherein the control unit further includes an error processing unit configured to increase a count of an error counter if the accident type determined by the accident determination unit is not the certain accident type.

17. The vehicle according to claim 16, further comprising an output device, wherein the error processing unit is configured to output warning information through the output device when the count exceeds a preset number.

18. The vehicle according to claim 17, wherein the output device includes a cluster, and the warning information includes an airbag warning light.

19. The vehicle according to claim 16, wherein the error processing unit is configured to store time and location information when the count is increased.

20. The vehicle according to claim 19, wherein the time and location information is obtained from GPS information of the emergency call unit.

* * * * *